United States Patent [19]
Chen et al.

[11] Patent Number: 5,639,286
[45] Date of Patent: Jun. 17, 1997

[54] VERTICAL FLUID DYNAMIC COOLING TOWER

[76] Inventors: Chia Shien Chen, 2F., No. 3, Alley 16, Lane 235, Pao-Chiao Rd., Hsin Tien City, Taipei Hsien; Chiang Lai Chu, 4th Fl., No. 115, Sec. 1, Tung Ho E. St., Shih Lin District, Taipei, both of Taiwan

[21] Appl. No.: 570,930

[22] Filed: Dec. 12, 1995

[51] Int. Cl.$^6$ ............................................ B01F 3/04
[52] U.S. Cl. .................... 55/223; 261/116; 261/23.1; 261/148; 261/DIG. 85; 261/DIG. 11; 55/257.2
[58] Field of Search ..................... 261/116, 112.2, 261/23.1, 148, DIG. 85, DIG. 11; 55/223, 257.2

[56] References Cited

U.S. PATENT DOCUMENTS

| | | | |
|---|---|---|---|
| 1,647,281 | 11/1927 | Doyle | 261/DIG. 85 |
| 2,247,514 | 7/1941 | Mart | 261/DIG. 11 |
| 2,688,943 | 9/1954 | Wickland | 261/116 |
| 3,047,276 | 7/1962 | Sebald et al. | 261/116 |
| 3,767,177 | 10/1973 | Engalitcheff, Jr. et al. | 261/116 |
| 3,881,898 | 5/1975 | Darby et al. | 261/116 |
| 4,133,851 | 1/1979 | Ovard | 261/111 |
| 4,218,408 | 8/1980 | Henning et al. | 261/DIG. 11 |
| 4,891,170 | 1/1990 | Kokkonen et al. | 261/116 |
| 4,936,882 | 6/1990 | Chen et al. | 261/116 |

*Primary Examiner*—Tim R. Miles
*Attorney, Agent, or Firm*—Bacon & Thomas

[57] ABSTRACT

A vertical fluid dynamic cooling tower includes a shell which ha s a horizontal tubular injection element disposed inside. A pressurized heat liquid is pumped into the tubular element and ejected out upwardly through spaced nozzles disposed on the top of the tubular element to create a continuous screen of dispersed liquid flow. A diffuser is disposed within the shell and above the injection tubular element to enable the ejected heated fluid to convert pressure to kinetic energy, to induce negative pressure at a lower section and to generate a cooling effect for the heated fluid. A mist eliminator is disposed at the top of the shell to separate fluid from the air. An air exhaust outlet is located at the top of the shell for discharging heated air. The condensed and separated fluid falls down into a heat dissipating device located at the lower portion of the shell for a second heat exchange process. The cooled fluid then passes through a silencer and drops into a drip tray to be pumped for reuse.

5 Claims, 4 Drawing Sheets

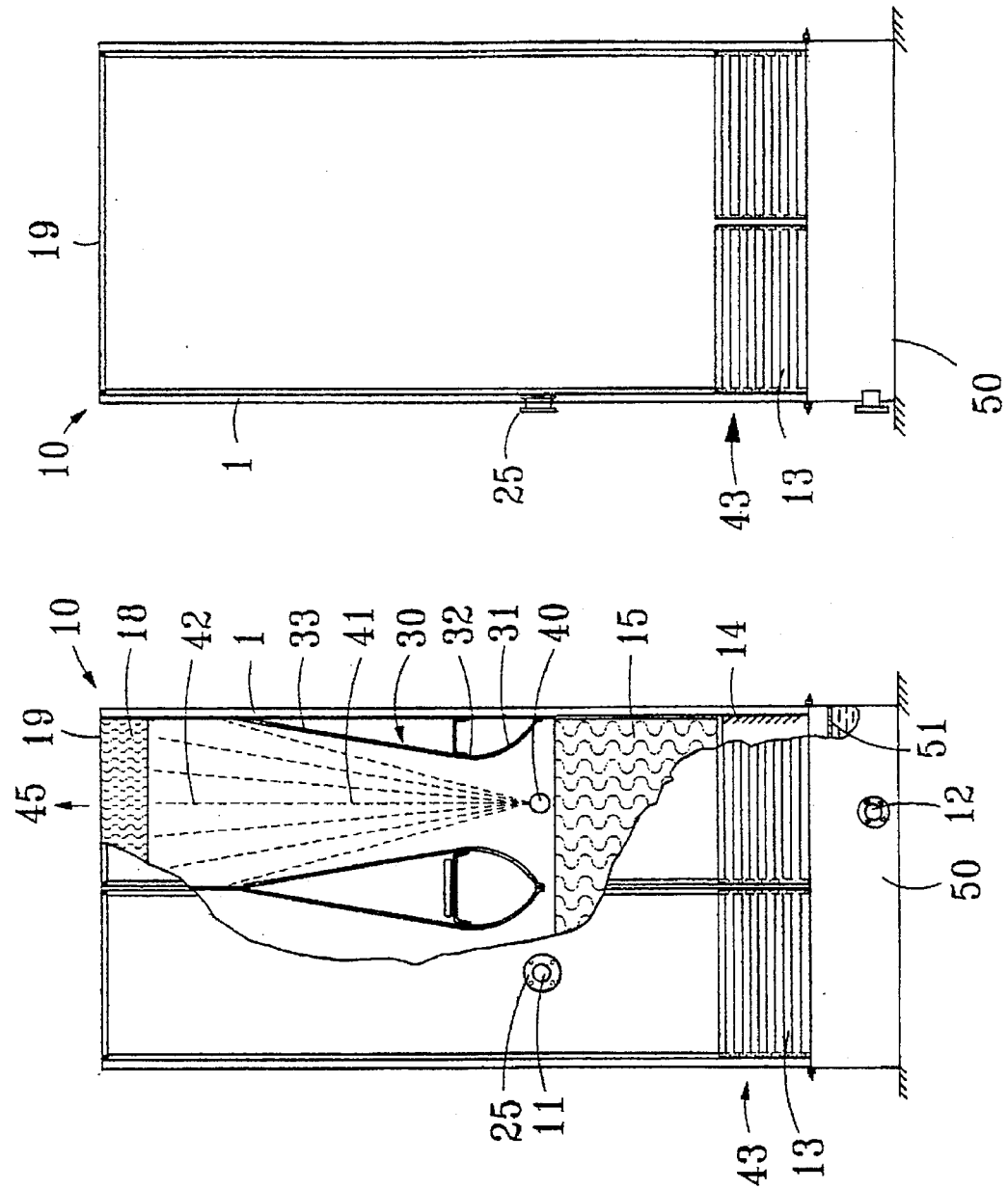

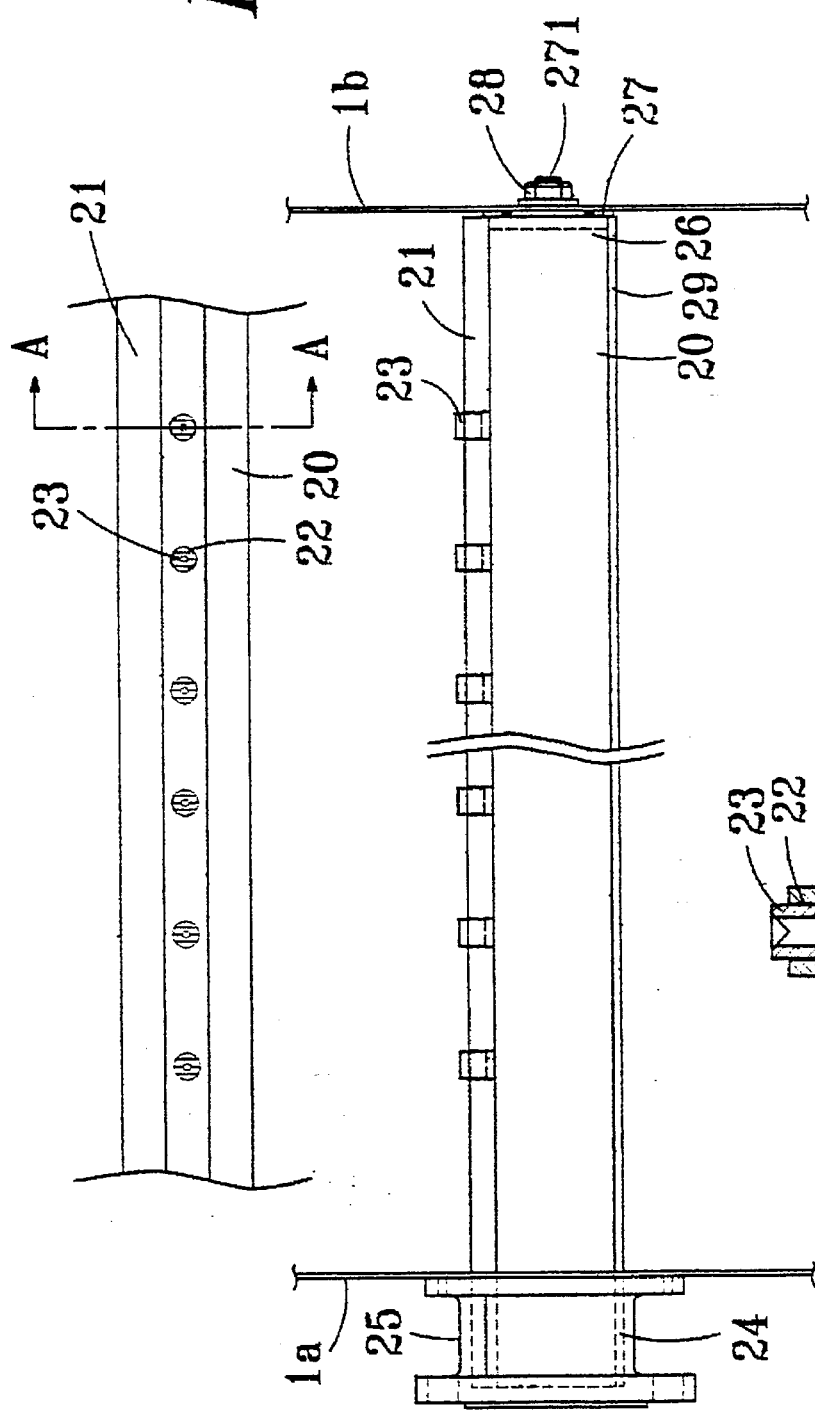
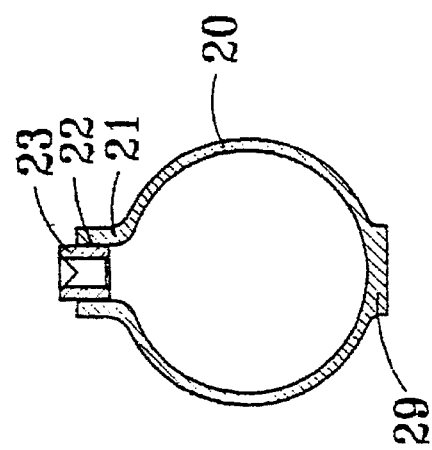

FIG. 3A
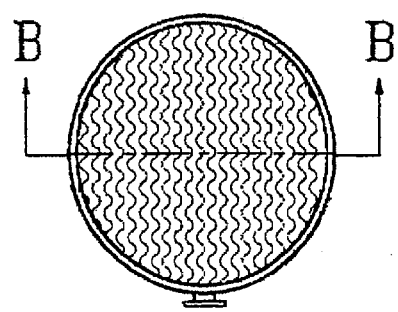
FIG. 3C
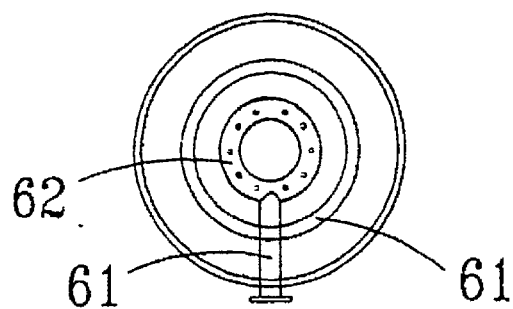
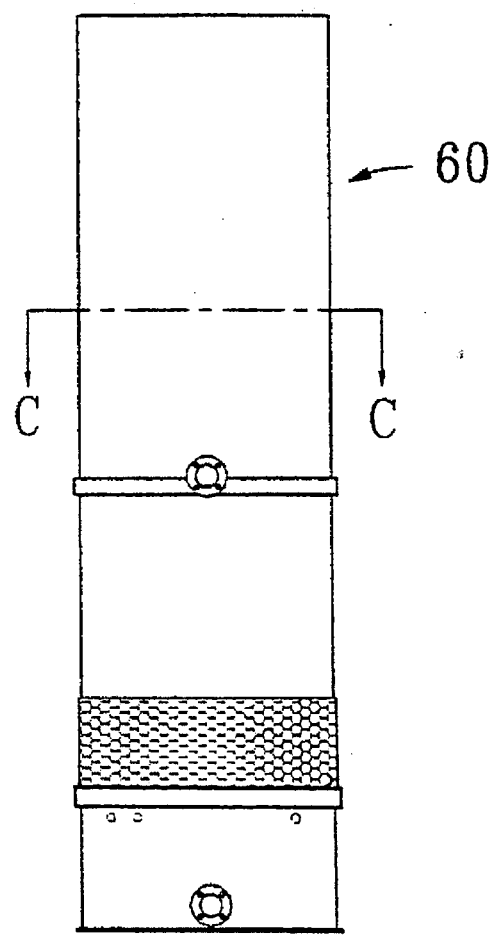
FIG. 3
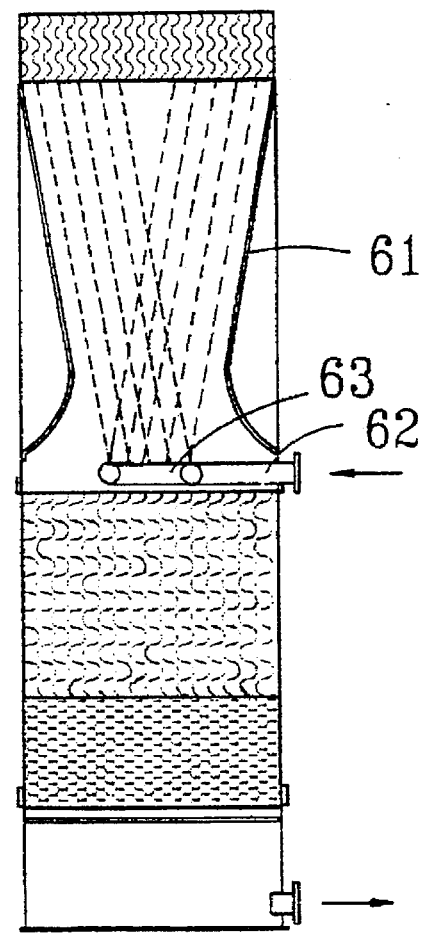
FIG. 3B

VERTICAL FLUID DYNAMIC COOLING TOWER

BACKGROUND OF THE INVENTION

1. Field of the Invention

The present invention relates to a cooling tower that dispenses with the motor and fan, and more particularly to a vertical fluid dynamic cooling tower which can achieve better heat exchange efficiency.

2. Description of the Prior Art

The applicant has filed and obtained a patent tired "Fluid Dynamic Cooling Tower" (U.S. Pat. No. 4,936,882, date of Patent, Jun. 26, 1990). In that patent, the shell is disposed substantially in a horizontal position. Therefore, it takes up a relatively large space. The heat exchange efficiency of the horizontally injecting liquid is not very high. Only one pass cooling effect was attained. Heated air exhaust outlet is small, thus reducing the discharge speed which in turn slows down the speed of the inlet cooling air from outside.

The present invention is an improvement over the previous invention set forth above. Instead of a horizontally disposed cooling tower, a vertically disposed cooling tower is adopted in the present invention. A conventional circular cooling tower has fan and motor disposed at the bottom or the top of the tower for drawing in outside air to perform heat a exchange function with the heat dissipating plate located inside the tower. There are many disadvantages in a conventional cooling tower, e.g. the cooling efficiency is relatively low, there are repairs and maintenance problems in mechanical and electrical elements, and water drips are prone to fly away and get lost. It causes waste of water resources and has a negative impact on environmental protection. The present invention has a mist eliminator disposed in the exhaust outlet to separate liquid from air, thus liquid can be recaptured for reuse without loss. The structure and the installation are also simpler.

SUMMARY OF THE INVENTION

It is an object of the present invention to provide a vertical fluid dynamic cooling tower in which the cooling fan is dispensed with. It employs fluid Kinetic energy and a diffuser to draw in outside cooling air to perform heat exchange in the cooling tower. The cooling tower is shaped in cylindrical or rectangular form. A plurality of rectangular type cooling towers can be put together in parallel for independent or combined use. The present invention has the following advantages:

1. It saves space and can be flexibly installed in many regular or odd shaped locations.
2. There is provided a mist eliminator to prevent water loss, to save water and to enhance sanitary conditions.
3. It is simple in structure and installation, and may be modularly assembled to have different cooling capacity to meet different requirements.
4. It has good looking appearance and can suit well with adjacent buildings and surroundings.
5. It provides two-pass cooling means and can achieve greater heat exchange efficiency.
6. It does not need a cooling fan, transmission belt, motor a or speed reducer, thus reducing initial cost and maintenance.
7. There is no operating noise of the fan or rotating elements.
8. It consumes less electric power.

BRIEF DESCRIPTION OF THE DRAWINGS

The drawings disclose illustrative embodiments of the present invention which serve to exemplify the various advantages and objects thereof, and are as follows:

FIG. 1 is a front elevation view, partly cutaway, of the present invention in rectangular shape embodiment.

FIG. 2 is a side elevation view of the present invention in rectangular shape embodiment.

FIG. 2A is a fragmentary side view of an injection tubular element for rectangular shape embodiment.

FIG. 3 is a front elevation view of the present invention in cylindrical shape embodiment.

FIG. 3A is a top view of the present invention in cylindrical shape embodiment.

FIG. 3B is a sectional view taken on line B—B of FIG. 3A.

FIG. 3C is a sectional view taken on line C—C of FIG. 3.

FIG. 4 is a fragmentary top view of an injection tubular element of the present invention.

FIG. 5 is a sectional view taken on line A—A of FIG. 4.

DETAILED DESCRIPTION OF THE PREFERRED EMBODIMENT

Figure 6:
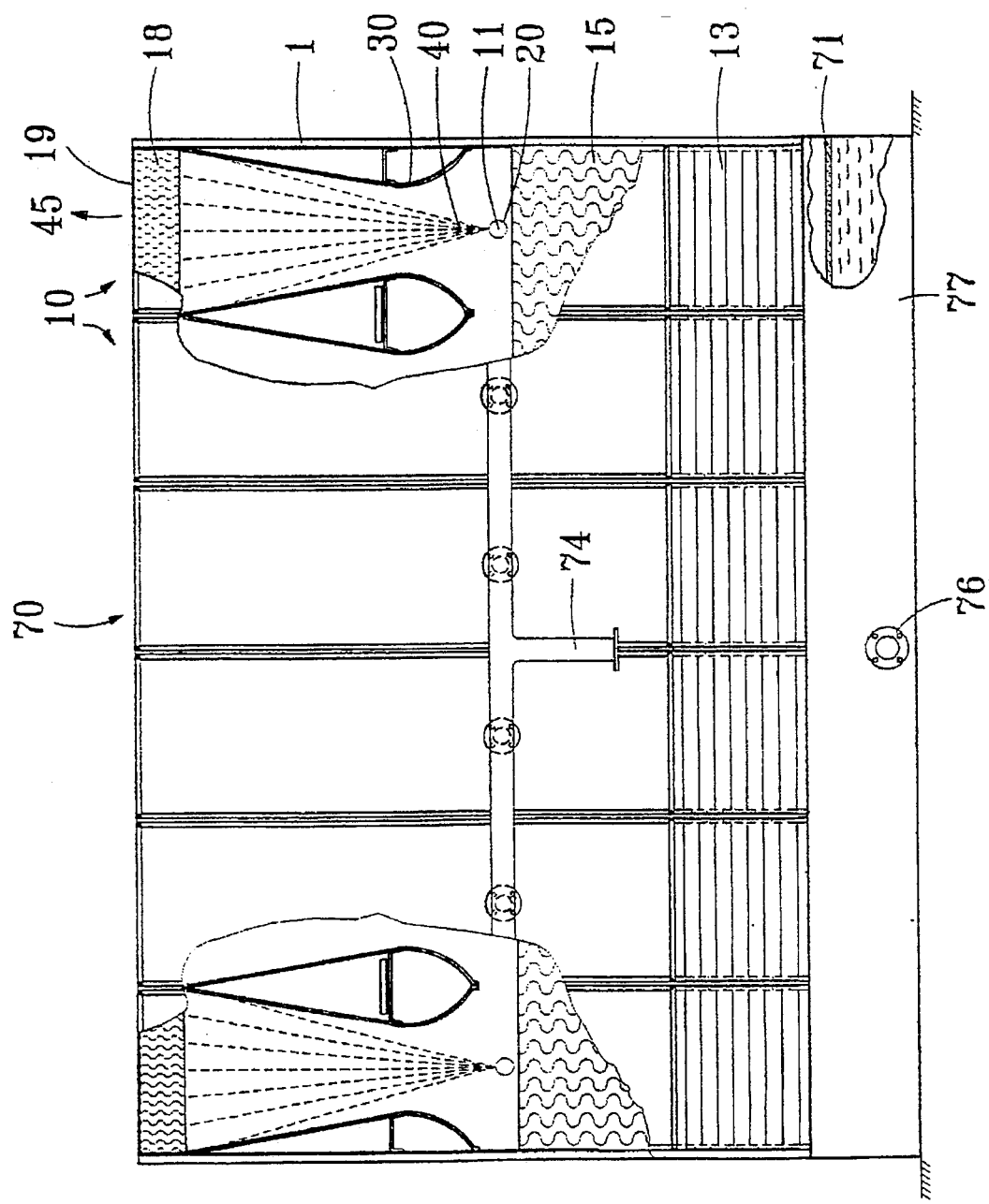
FIG. 6 is a front elevation view, partly cutaway, of a large scale embodiment of the present invention.

FIGS. 1 and 2 illustrate the present invention in a rectangularly shaped embodiment with a two cell structure. Each cell 10 has a substantially horizontal injection tubular element 20 disposed inside. Heated liquid 40 flows through liquid inlet 11 into injection tubular element 20 and ejects out to form a continuous screen of high velocity liquid flow 41 above the throat section of the diffuser 30, thereby producing negative pressure below the throat section of the diffuser 30, consequently inducing outside cooling air 43 to be drawn through air inlet 13 into the lower section of the cooling tower. The cooling air 43 flows upward through the diffuser 30 and mixes with heated liquid flow 41 to perform a heat exchange function. Heated air 45 then flows upward through mist eliminator 18 which separates water from the air. The moisture-removed heated air 45 is then discharged out of the cooling tower via air exhaust outlet 19. The separated cooling liquid 42 falls downwardly amid the upwardly flowing cooling air 43 for another heat exchange process until the cooling liquid 42 passes through the diffuser 30 and falls into heat dissipating device 15 for the second pass heat exchange process. The cooled liquid 42 then falls into the silencer 51 which filters out the debris that might still be contained in liquid 42. The filtered cooled water then drops into the drip tray 50 and is pumped via liquid outer 12 for reuse.

Cooling tower 10 includes a shell 1 made of rust resistant plastic material or plated steel sheet. Shell 1 is water tight except for the heated air exhaust outlet 19 at the top and the cool air inlet 13 at the bottom. Air inlet 13 may be formed as a louver-type structure with slanting vanes 14 directed inwardly downward to allow outside cooling air to flow into the interior of the cooling tower. Vanes 14 also can prevent undesirable objects from entering into the cooling tower. Above the air inlet 13 there is provided a heat dissipating device 15 for performing the second pass heat exchange function.

Diffuser 30 is located above the heat dissipating device 15. An injection tubular element 20 is disposed at the intersection of the heat dissipating device 15 and the diffuser 30. Injection tubular element 20 has a protruding flange 21 axially formed on the top surface (refer to FIG. 5). A plurality of spaced openings 22 are formed in the protruding flange 21 (refer to FIG. 4). There is a V-shape nozzle 23 disposed in each opening 22 (refer to FIG. 5) which enables heated liquid 40 to be ejected outwardly therethrough. Injection tubular element 20 has one opening end 24 engaged with a flange coupler 25 which in turn is screwed on a side wall 1a of the shell 1 (refer to FIG. 2A). Heated liquid 40 is transmitted into the cooling tower via a conduit connecting to the flange coupler 25. Another end 26 of the injection tubular element 20 is closed and sealed by a plug 27 which has a stud 271 and a nut 28 secured on another side wall 1b of the shell 1. There is a protruding ridge 29 axially formed underneath the injection tubular element 20 for reinforcing the strength thereof.

Diffuser 30 includes a reducing section 31 at the lower portion, a throat section 32 in the middle and an expanding section 33 at the upper portion. High velocity liquid flow 41, when passing through the throat section 32, converts the liquid pressure at nozzle 21 into kinetic energy which causes the pressure to drop sharply, thus resulting in a negative pressure in the lower section of the diffuser 30 and produces a strong jet suction inlet for the outside cooling air 43. Then cooling air 43 and high velocity liquid flow 41 enter in the throat section 32 and undergo a turbulent mixing. The mixing air and liquid moisture flow upward in the expanding section 33 in which the kinetic energy is converted into pressure energy due to the enlarged space which has strong cooling effect. Thus, the present invention employs heated air flowing upward naturally and the pressure building resulting from flowing fluid to perform the desired cooling function without a fan or motor as in the conventional cooling tower.

A mist eliminator 18 is disposed at the top of shell 1 for separating liquid from the air in the air liquid mixture. The air 45 with the liquid-removed is then discharged out via air exhaust outlet 19. Mist eliminator 18 is made of spaced corrugated laminates which can reduce liquid loss the discharged heated air 45 to below 0.1%. The condensed liquid 42 falls down from the mist eliminator 18 and undergoes another cooling cycle with the incoming cooling air 43 in the diffuser 30. The condensed liquid then drops into a known heat dissipating device 15 comprising a plurality of corrugated sheets for the second cooling cycle and finally falls into the drip tray 50 located at the bottom of the shell.

FIG. 3 illustrates a cylindrically shaped embodiment of the present invention in a single cell structure. It is structured similarly to the rectangularly shaped embodiment set forth above. Cooling tower 60 has a circular shell and diffuser. The injection tubular element 62 has an annular shape. The diffuser 61 has a substantially conical throat section and may be welded or screwed to the inside of the shell. The liquid ejection and air flow process are the same as in the rectangularly shaped embodiment.

FIG. 6 illustrates a large scale embodiment of the present invention. The cooling tower 70 is composed of a plurality of cooling cells 10 disposed together in parallel. Each cell 10 includes an injection tubular element 20, a diffuser 30, a mist eliminator 18, a heat dissipating device 15, an air inlet 13 and an air outlet 19. A liquid circulating system includes a main liquid inlet pipe 74, a main liquid outlet pipe 76, a silencer 71, and a drip tray 77. Main liquid inlet pipe 74 distributes heated liquid 40 to each injection tubular element 20. After the heat exchange process, heated air 45 is discharged out through air exhaust outlet 19. Cooling liquid 42 is collected in the drip tray 77 and is pumped through the main liquid outlet pipe 76 for other applications. The present invention may be used individually or collectively. It can be used in associated with the existing conventional cooling tower. It can also be used for moisturizing or warming purposes.

The following is some of the testing data of the present invention. For a 30 cooling Ton capacity cooling tower (shown in FIG. 1), inlet water flowing rate being set at 390 liter/minute, pressure is less than 1 kg/cm2 at the temperature of 37° C., outside cooling air is at temperature of 25.7° C. Outlet liquid temperature is 32° C., discharged exhaust air has temperature of 35.4° C. at a speed of 3.7 meter/second in the center of air exhaust outlet. The discharged air has a speed of 2.5–3.2 meter/second around the air exhaust outlet with an average speed of 2.86 m/s. Air discharged volume is 247 m3/minute and is about 20% greater than a conventional tower which has discharged a volume of about 200 m3/minute. The present invention which includes a two-cell structure and at a dimension of 120 cm wide, 120 cm long and 267 cm high has a noise level of less than 60 dBA at a the distance of 1 meter outside the shell. The cooling efficiency and performance of the present invention is as good as or even better than the cooling tower facilities produced by noted manufacturers. Furthermore, the present invention does not need a fan, motor or a speed reducer. It costs less, generates less noise, takes less space, and has no repair or maintenance problems. The nozzle of the injection tubular element needs to sustain pressure at merely 1 kg/cm2. The operational cost is also lower.

Many changes and modification in the above described embodiments of the invention can, of course, be carded out without departing from the scope thereof. Accordingly, to promote the progress in science and the useful arts, the invention is disclosed and is intended to be limited only by the scope of the appended claims.

What is claimed is:

1. A vertical fluid dynamic cooling tower comprising:

a shell having an interior, an air exhaust outlet at a top in communication with the interior and an air inlet at a lower portion in communication with the interior;

a diffuser located inside the shell wherein the diffuser has a reducing section at a lower portion, a throat section at a middle portion and an expanding section at an upper portion;

a tubular injection element disposed horizontally in the interior of the shell below the diffuser and having an axially disposed flange on a top surface upon which are located a plurality of spaced openings with each opening having a v-shaped nozzle disposed therein for injecting heated liquid upwardly into the diffuser and to draw air into the diffuser to create a liquid air mixture;

a heat dissipating device located inside the shell, below the tubular injection element and above the air inlet for performing heat exchange to generate cooled liquid;

a drip tray located at a bottom of the shell having a silencer disposed thereabove for filtering out debris and noise in the cooled fluid and having a pump for recirculating the cooled fluid; and, a mist eliminator located in the expanding section of the diffuser to separate liquid from the liquid air mixture such that air is passed through the exhaust outlet and the separated liquid passes downwardly through the diffuser into the heat dissipating device.

2. The cooling tower of claim 1, wherein the air inlet comprises a plurality of guiding vanes to direct air inwardly and downwardly through the air inlet.

3. The cooling tower of claim 1, wherein the shell has a rectangular cross-sectional configuration wherein the tubular injection element has one opening end engaged with a flange coupler fixed on a side wall of the shell and has another end closed and sealed by a plug fixed on another side wall of the shell.

4. The cooling tower of claim 1, wherein the shell has a cylindrical form with a circular cross-sectional configuration, wherein the tubular injection element has an annular shape having one opening end as liquid inlet connected with a linear tube which engages with a flange coupler fixed on a lateral wall of the shell.

5. The cooling tower of claim 1, wherein the mist eliminator comprises a corrugated spaced laminate located in the air exhaust outlet for separating liquid from air in the mixed fluid.

* * * * *